US009265062B2

(12) United States Patent  
Ishii et al.

(10) Patent No.: US 9,265,062 B2
(45) Date of Patent: Feb. 16, 2016

(54) MOBILE STATION, WIRELESS ACCESS NETWORK DEVICE, MOBILE COMMUNICATION SYSTEM, AND COMMUNICATION METHOD

(75) Inventors: Minami Ishii, Yokohama (JP); Anil Umesh, Yokohama (JP); Sadayuki Abeta, Yokohama (JP); Takehiro Nakamura, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 1430 days.

(21) Appl. No.: 11/996,951

(22) PCT Filed: Jul. 25, 2006

(86) PCT No.: PCT/JP2006/314625
§ 371 (c)(1),
(2), (4) Date: Sep. 24, 2009

(87) PCT Pub. No.: WO2007/013427
PCT Pub. Date: Feb. 1, 2007

(65) Prior Publication Data
US 2010/0208628 A1    Aug. 19, 2010

(30) Foreign Application Priority Data

Jul. 27, 2005  (JP) ................................. 2005-217578

(51) Int. Cl.
*H04W 4/00*      (2009.01)
*H04W 72/12*     (2009.01)
*H04W 76/02*     (2009.01)

(52) U.S. Cl.
CPC ........ *H04W 72/1289* (2013.01); *H04W 76/021* (2013.01); *H04W 76/027* (2013.01); *Y02B 60/50* (2013.01)

(58) Field of Classification Search
USPC ................. 370/328, 338, 350, 389, 401, 410
See application file for complete search history.

(56) References Cited

U.S. PATENT DOCUMENTS

| 6,574,453 | B1 * | 6/2003 | Honda et al. ............... 455/11.1 |
| 7,089,311 | B2 * | 8/2006 | Devine et al. ............... 709/227 |

(Continued)

FOREIGN PATENT DOCUMENTS

| JP | 11-088255 | 3/1999 |
| JP | 11-215051 | 8/1999 |

(Continued)

OTHER PUBLICATIONS

3GPP TS 25.331 V6.5.0 Mar. 2005 "Protocol Specification" (1145 pages).

(Continued)

*Primary Examiner* — Ricky Ngo
*Assistant Examiner* — Christine Ng
(74) *Attorney, Agent, or Firm* — Osha Liang LLP

(57) ABSTRACT

A mobile communication system is provided that performs bi-directional communications between a mobile station and a wireless access network device. The mobile station includes a connection set-up signal reception timing calculation unit for calculating a reception timing of a connection set-up signal when a connection request signal is transmitted, and a connection set-up signal reception determination unit that determines, according to the reception timing, whether the connection set-up signal is received, and performs a signal reception operation based on the determination. The wireless access network device includes a connection set-up signal scheduling unit that, after receiving a connection request signal from the mobile station, performs a connection set-up signal transmission assignment based on a reception timing of the connection request signal, a connection set-up signal generation unit that generates a connection set-up signal to be sent to the mobile station; and a connection set-up signal transmission unit that transmits the connection set-up signal based on the connection set-up signal transmission assignment.

13 Claims, 5 Drawing Sheets

(56) References Cited

U.S. PATENT DOCUMENTS

| | | | |
|---|---|---|---|
| 7,266,372 B2 * | 9/2007 | Moon et al. | 455/422.1 |
| 7,463,891 B2 * | 12/2008 | Yi et al. | 455/450 |
| 7,613,473 B2 * | 11/2009 | Yi et al. | 455/518 |
| 2004/0042492 A1 * | 3/2004 | Suzuki et al. | 370/473 |
| 2004/0148364 A1 * | 7/2004 | Kim et al. | 709/217 |
| 2005/0026597 A1 * | 2/2005 | Kim et al. | 455/412.1 |
| 2006/0133409 A1 * | 6/2006 | Prakash et al. | 370/450 |

FOREIGN PATENT DOCUMENTS

| | | |
|---|---|---|
| JP | 2005-130266 | 5/2005 |
| JP | 2005-130436 | 5/2005 |
| WO | 2004102837 A1 | 11/2004 |

OTHER PUBLICATIONS

Extended European Search Report for Application No. 06781537.3, mailed on Nov. 4, 2010 (11 pages).

Nokia, "Correction to the size of response time fields" 3GPP Draft; GP-040829, 3rd Generation Partnership Project (3GPP), Mobile Competence Centre; 650, Route des Lucioles; F-06921 Sophia-Antipolis Cedex; France, vol. TSG Geran, no. Cancun; Apr. 14, 2004.

International Search Report (English and Japanese) for PCT/JP2006/314625 dated Oct. 31, 2006 (9 pages).

Written Opinion of ISA (Japanese) for PCT/JP2006/314625 dated Oct. 31, 2006 (3 pages).

* cited by examiner

MOBILE STATION, WIRELESS ACCESS NETWORK DEVICE, MOBILE COMMUNICATION SYSTEM, AND COMMUNICATION METHOD

TECHNICAL FIELD

The present invention relates to a call connection method in a mobile communication system, and particularly, to a mobile station, a wireless access network device, a mobile communication system, and a communication method for controlling transmission timing of channels used for the call connection.

BACKGROUND OF THE INVENTION

In a mobile communication system, setting up a connection between a mobile station and a wireless access network device is started upon a connection request from the mobile station or the wireless access network device.

FIG. 1 is a sequence diagram exemplifying a sequence of setting up a connection between a mobile station and a wireless access network device when the connection request is made from the side of the mobile station.

As shown in FIG. 1, first, the mobile station transmits a radio resource control (RRC) connection request signal through a random access channel (RACH), which is mapped into (namely, associated with) a physical random access channel (PRACH) (in other words, transmitting the random access channel (RACH), which is a transport channel, with the physical random access channel (PRACH), which is a physical channel.

After receiving the RRC connection request signal, the wireless access network device transmits a RRC connection set-up signal through a forward access channel (FACH), which is mapped into a secondary common control physical channel (SCCPCH).

Next, after receiving the RRC connection setup signal, the mobile station switches to a dedicated physical channel (DPCH), and transmits a RRC connection setup complete signal. After, that, signal transmission and reception are performed with the dedicated physical channel (DPCH).

As described above, in the related art, the mobile station and the wireless access network device need to switch, before the connection setup is completed, the physical channel for signal transmission and reception from the physical random access channel (PRACH), which is an uplink common physical channel, to the secondary common control physical channel (SCCPCH), which is a downlink shared channel, and further to the dedicated physical channel (DPCH).

In addition, after the mobile station transmits the radio resource control (RRC) connection request signal, if the mobile station fails to receive the RRC connection set-up signal from the wireless access network device within a time period T300, which is designated by the wireless access network device in advance, the mobile station needs to repeatedly execute the above connection operations up to the number of times (N300) designated by the wireless access network device.

For example, this technique is disclosed in "3GPP TS 25.331 v6.5.0".

DISCLOSURE OF THE INVENTION

Problems to be Solved by the Invention

However, the above technique involves the following problems.

After the mobile station transmits the radio resource control (RRC) connection request signal through the physical random access channel (PRACH), the wireless access network device, which receives the RRC connection request signal, transmits the RRC connection set-up signal to the mobile station through the forward access channel (FACH), which is mapped into a secondary common control physical channel (SCCPCH).

Since transmission of the RRC connection set-up signal is performed at any timing, the mobile station has to be constantly maintained in a state for receiving the forward access channel (FACH) signal, and to determine whether the RRC connection set-up signal for itself exists or not.

Since the mobile station constantly maintained in a state for receiving the forward access channel (FACH) signal also receives messages transmitted toward other mobile stations, the mobile station has to determine whether a message is for it or not. For this reason, the mobile station performs signal reception operations even when there is not a message sent to it, and this causes consumption of the battery power.

In addition, when the mobile station fails to receive the RRC connection set-up signal from the wireless access network device within a time period T300, which is designated by the wireless access network device in advance, the mobile station has to transmit the radio resource control (RRC) connection request signal again. If the mobile station still fails to receive the RRC connection set-up signal within the time period T300 after re-sending the radio resource control (RRC) connection request signal, the mobile station has to repeat transmission of the radio resource control (RRC) connection request signal once again. Further, this operation will be repeated for N300 number of times, which number is also designated by the wireless access network device in advance. Due to this, a connection delay and battery power consumption increase, and in the worst case, a connection delay of N300 times T300 may arise.

Further, after receiving the RRC connection set-up signal, the mobile station transmits a RRC connection set-up complete signal through the dedicated physical channel (DPCH). Before transmitting the signal through the dedicated physical channel (DPCH), it is necessary for the mobile station to set up the dedicated physical channel (DPCH), and obtain synchronization in the dedicated physical channel (DPCH). For this reason, a signal length increases due to additional channel set-up information, and re-synchronization due to DPCH switching costs time.

In addition, during synchronization set-up between the mobile station and the wireless access network device, signal transmission and reception are disabled, and this causes further delay.

An object of the present invention is to provide a mobile station, a wireless access network device, a mobile communication system, and a communication method able to reduce a connection delay, and lower the power consumption.

Methods to Solve the Problems

According to an aspect of the present invention, there is provided a mobile station for bi-directional communications with a wireless access network device, comprising:

a connection set-up signal reception timing calculation unit that calculates a reception timing of a connection set-up signal when a connection request signal is transmitted; and a connection set-up signal reception determination unit that determines, according to the reception timing, whether the connection set-up signal is received, and performs a signal reception operation based on the determination.

According to another aspect of the present invention, there is provided a wireless access network device for bi-directional communications with a mobile station, comprising:

a connection set-up signal scheduling unit that, after receiving a connection request signal from the mobile station, performs a connection set-up signal transmission assignment based on a reception timing of the connection request signal;

a connection set-up signal generation unit that generates a connection set-up signal to be sent to the mobile station; and a connection set-up signal transmission unit that transmits the connection set-up signal based on the connection set-up signal transmission assignment.

According to still another aspect of the present invention, there is provided a mobile communication system that performs bi-directional communications between a mobile station and a wireless access network device, wherein the mobile station includes:

a connection set-up signal reception timing calculation unit that calculates a reception timing of a connection set-up signal when a connection request signal is transmitted; and a connection set-up signal reception determination unit that determines, according to the reception timing, whether the connection set-up signal is received, and performs a signal reception operation based on the determination; and the wireless access network device includes:

a connection set-up signal scheduling unit that, after receiving a connection request signal from the mobile station, performs a connection set-up signal transmission assignment based on a reception timing of the connection request signal;

a connection set-up signal generation unit that generates a connection set-up signal to be sent to the mobile station; and a connection set-up signal transmission unit that transmits the connection set-up signal based on the connection set-up signal transmission assignment.

According to yet another aspect of the present invention, there is provided a mobile communication method for bi-directional communications between a mobile station and a wireless access network device, comprising:

a connection request signal transmission step for transmitting a connection request signal from the mobile station;

a connection set-up signal reception timing calculation step for calculating, by the mobile station, a reception timing of a connection set-up signal;

a connection request signal reception step for receiving, by the wireless access network device, the connection request signal from the mobile station;

a connection set-up signal scheduling unit step for performing, by the wireless access network device, a connection set-up signal transmission assignment based on a reception timing of the connection request signal;

a connection set-up signal generation step for generating, by the wireless access network device, a connection set-up signal to be sent to the mobile station;

a connection set-up signal transmission step for transmitting, by the wireless access network device, the connection set-up signal based on the connection set-up signal transmission assignment;

a connection set-up signal determination step for determining, according to the reception timing, whether the connection set-up signal is received; and a connection set-up signal reception step for performing a signal reception operation based on the determination.

Advantages of the Invention

According to the present invention, it is possible to provide a mobile station, a wireless access network device, a mobile communication system, and a communication method able to reduce a connection delay, and lower the power consumption.

PREFERRED EMBODIMENTS FOR CARRYING OUT THE INVENTION

Below, embodiments of the present invention are explained with reference to the accompanying drawings, in which the same reference numbers are assigned to elements having the same functions, and overlapping descriptions are omitted.

Figure 1:
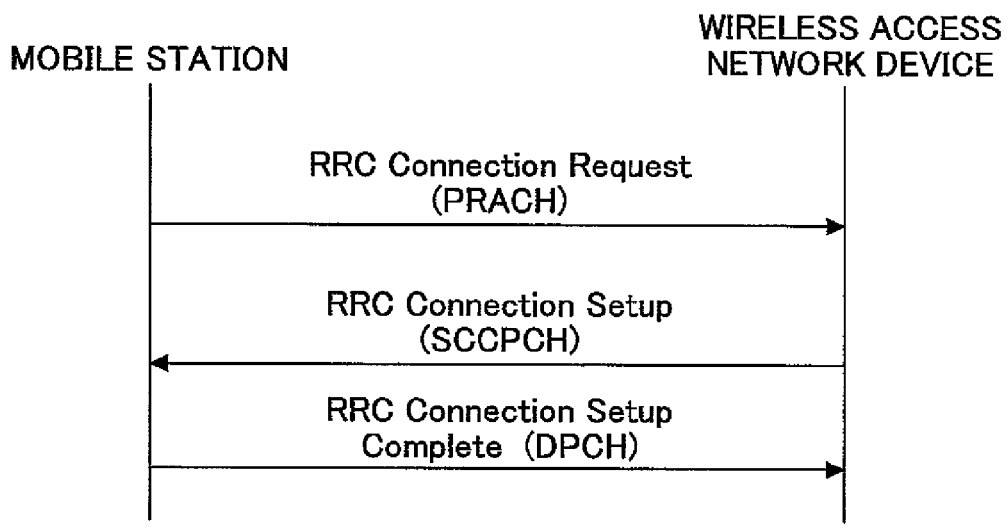
FIG. 1 is a sequence diagram exemplifying a sequence of setting up a connection between a mobile station and a wireless access network device when the connection request is made from the side of the mobile station.
Figure 2:
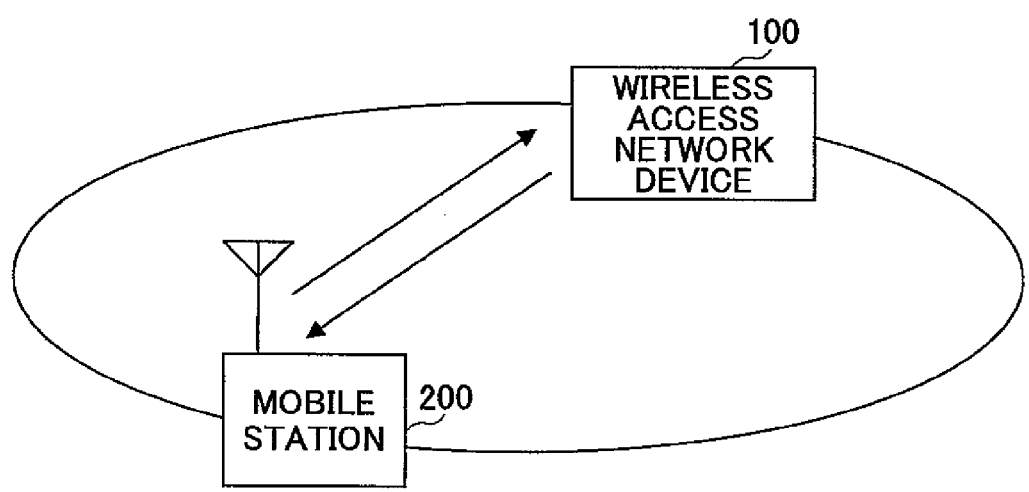
FIG. 2 is a diagram illustrating a mobile communication system according to an embodiment of the present invention.

FIG. 2 is a diagram illustrating a mobile communication system according to an embodiment of the present invention.

The mobile communication system of the present embodiment includes a mobile station 200 and a wireless access network device 100, and the mobile station 200 and the wireless access network device 100 are able to perform wireless communication with each other.

Note that in the specification and claims of the present application, the wireless access network device 100 may be a wireless base station, a wireless control device, or a device including the wireless base station and the wireless control device.

In the mobile communication system of the present embodiment, transmission timing control is performed, in which a time period from reception of a radio resource control (RRC) connection request signal to transmission of a radio resource control (RRC) connection set-up signal is fixed. Due to this, it is possible to reduce a connection delay and lower the battery power consumption.

Figure 3:
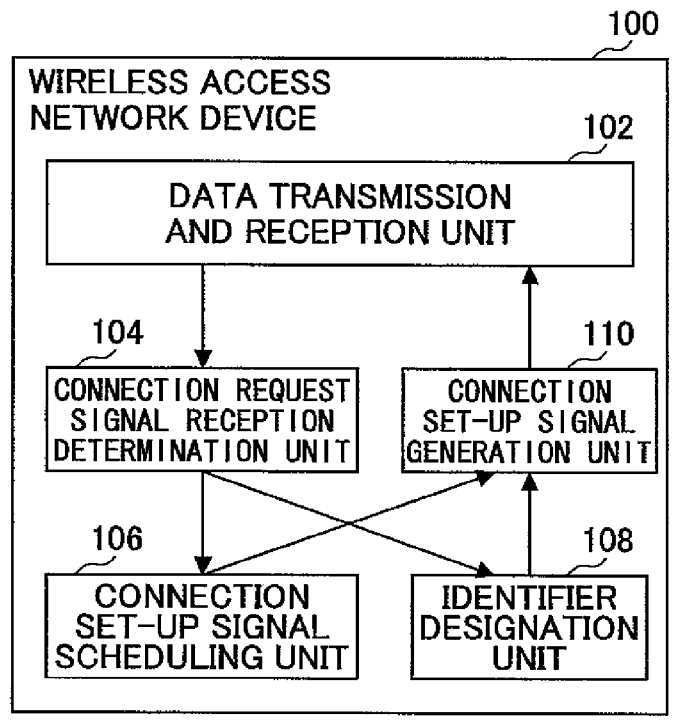
FIG. 3 is a block diagram illustrating a configuration of the wireless access network device 100 according to the embodiment of the present invention.

Next, the wireless access network device 100 is explained with reference to FIG. 3.

The wireless access network device 100 includes a data transmission and reception unit 102, a connection request signal reception determination unit 104, a connection set-up signal generation unit 110, a connection set-up signal scheduling unit 106, and an identifier designation unit 108. The connection request signal reception determination unit 104 and the connection set-up signal generation unit 110 are connected to the data transmission and reception unit 102; the connection set-up signal scheduling unit 106 and the identifier designation unit 108 are connected to the connection request signal reception determination unit 104 and the connection set-up signal generation unit 110.

The data transmission and reception unit 102 performs reception of the RRC connection request signal from the mobile station, and transmission of the RRC connection set-up signal.

The connection request signal reception determination unit 104 determines whether the RRC connection request signal is received. When the RRC connection request signal is received, the connection request signal reception determination unit 104 inputs information indicating reception of the RRC connection request signal into the connection set-up signal scheduling unit 106 and the identifier designation unit 108.

The connection set-up signal scheduling unit 106 determines transmission timing of the RRC connection set-up signal based on the reception timing of the RRC connection request signal, and inputs information indicating the determined transmission timing into the connection set-up signal generation unit 110. For example, the connection set-up signal scheduling unit 106 sets the period from the time the RRC connection request signal is received from the mobile station to the time the RRC connection set-up signal is transmitted to be a fixed value Tsetup in advance, and determines the transmission timing based on the fixed value Tsetup. The connection set-up signal scheduling unit 106 may determine the fixed value Tsetup based on the maximum of possible transmission timings of the RRC connection set-up signal.

The identifier designation unit 108 designates an identifier and inputs the identifier into the connection set-up signal generation unit 110. The connection set-up signal generation unit 110 appends the identifier to the RRC connection set-up signal. The mobile station which transmitted the RRC connection request signal can determine whether a RRC connection set-up signal is from itself based on the identifier appended to the RRC connection set-up signal, which corresponds to the RRC connection request signal.

For example, the identifier designation unit 108 designates at least one of an identifier between the mobile station 200 and a node of a rank higher than the wireless access network device 100, namely, between the mobile station 200 and a core network, an identifier indicating the RRC connection set-up signal, a temporary identifier selected by the mobile station when transmitting the RRC connection request signal, and an identifier indicating a cell.

The connection set-up signal generation unit 110 generates the RRC connection set-up signal and inputs the generated RRC connection set-up signal to the data transmission and reception unit 102. For example, the connection set-up signal generation unit 110 appends the identifier designated in the identifier designation unit 108 to generate the RRC connection set-up signal.

Figure 4:
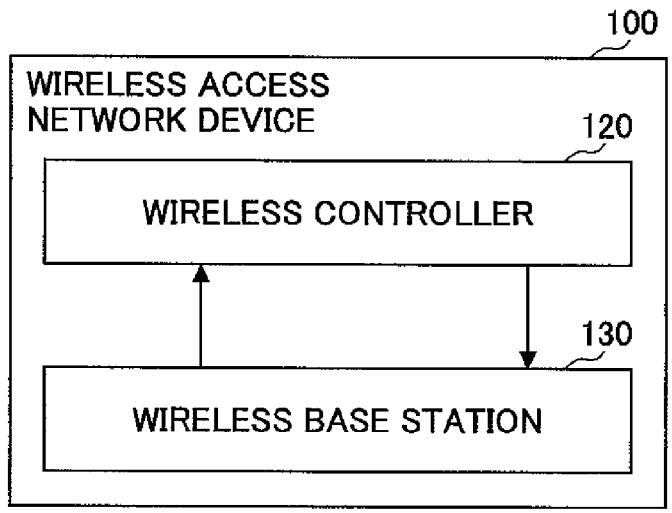
FIG. 4 is a block diagram illustrating a configuration of the wireless access network device 100 according to the embodiment of the present invention.

In the present embodiment, as shown in FIG. 4, the connection set-up signal generation unit 110 may be realized by a wireless controller 120 and a wireless base station 130. In this case, for example, the connection request signal reception determination unit 104 and the connection set-up signal generation unit 110 are arranged in the wireless controller 120, and the data transmission and reception unit 102 and the connection set-up signal scheduling unit 106 are arranged in the wireless base station 130. In addition, depending on the type of the identifier to be designated, the identifier designation unit 108 may be arranged in either the wireless controller 120 or the wireless base station 130. For example, when the identifier between the mobile station 200 and a higher rank node of the wireless access network device 100, or the identifier indicating the RRC connection set-up signal is designated, the identifier designation unit 108 is arranged in the wireless controller 120; when the temporary identifier selected by the mobile station when transmitting the RRC connection request signal, or the identifier indicating a cell is designated, the identifier designation unit 108 is arranged in the wireless base station 130.

Figure 5:
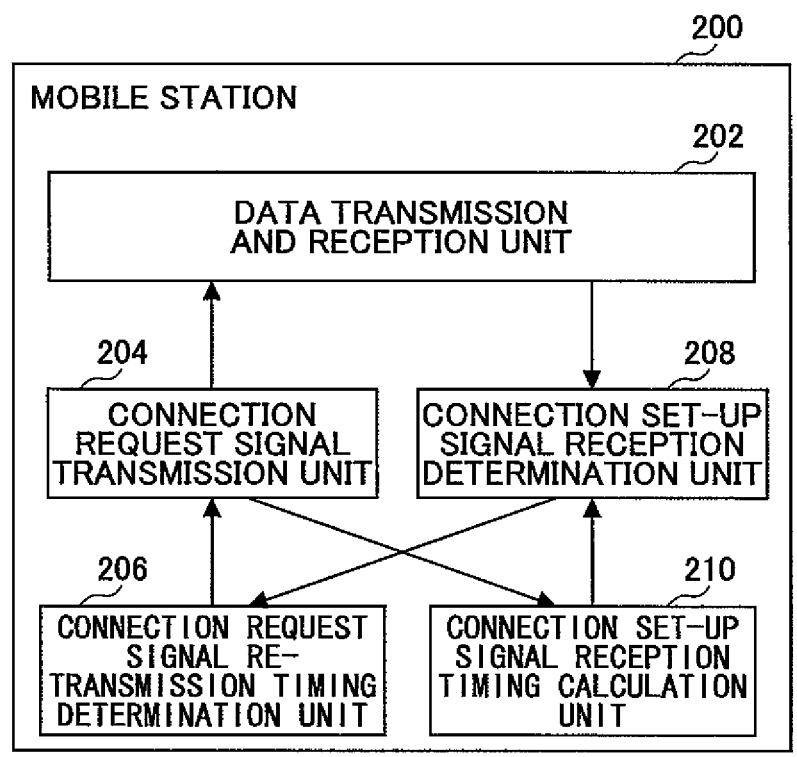
FIG. 5 is a block diagram illustrating a configuration of the mobile station 200 according to the embodiment of the present invention.

Next, the mobile station 200 is explained with reference to FIG. 5.

The mobile station 200 includes a data transmission and reception unit 202, a connection request signal transmission unit 204, a connection set-up signal reception determination unit 208, a connection request signal re-transmission timing determination unit 206, and a connection set-up signal reception timing calculation unit 210.

The connection request signal transmission unit 204 and the connection set-up signal reception determination unit 208 are connected to the data transmission and reception unit 202.

The connection request signal re-transmission timing determination unit 206 and the connection set-up signal reception timing calculation unit 210 are connected to the connection request signal transmission unit 204 and the connection set-up signal reception determination unit 208.

The data transmission and reception unit 202 performs transmission of the RRC connection request signal and reception of the RRC connection set-up signal.

The connection request signal transmission unit 204 performs transmission of the RRC connection request signal. The mobile station 200 transmits the RRC connection request signal from the data transmission and reception unit 202.

The connection set-up signal reception timing calculation unit 210 calculates reception timing of the RRC connection set-up signal based on the transmission timing of the RRC connection request signal, and inputs the calculation results into the connection set-up signal reception determination unit 208. For example, the connection set-up signal reception timing calculation unit 210 sets the period from the time the RRC connection request signal is received from the mobile station to the time the RRC connection set-up signal is transmitted to be a fixed value Tsetup in advance, and determines the reception timing based on the fixed value Tsetup. Further, the connection set-up signal reception timing calculation unit 210 may use the maximum of possible reception timings of the RRC connection set-up signal as the fixed value Tsetup, and input the fixed value Tsetup into the connection set-up signal reception determination unit 208.

The connection set-up signal reception determination unit 208 determines whether the RRC connection set-up signal is received. When it is detected that the RRC connection set-up signal is received, the connection set-up signal reception determination unit 208 inputs a command to the data transmission and reception unit 202 to start transmission of uplink data. As a result, transmission of uplink data is started. On the other hand, when reception of the RRC connection set-up signal is not detected, the connection set-up signal reception determination unit 208 inputs information indicating that the RRC connection set-up signal is not received into the connection request signal re-transmission timing determination unit 206.

The connection request signal re-transmission timing determination unit 206 determines the timing of re-transmitting the RRC connection request signal. Further, the connection request signal re-transmission timing determination unit 206 inputs information indicating the determined re-transmission timing of the RRC connection request signal into the connection request signal transmission unit 204. As a result, the RRC connection request signal is re-transmitted.

Next, operations of the mobile communication system of the present embodiment are described.

Figure 6:
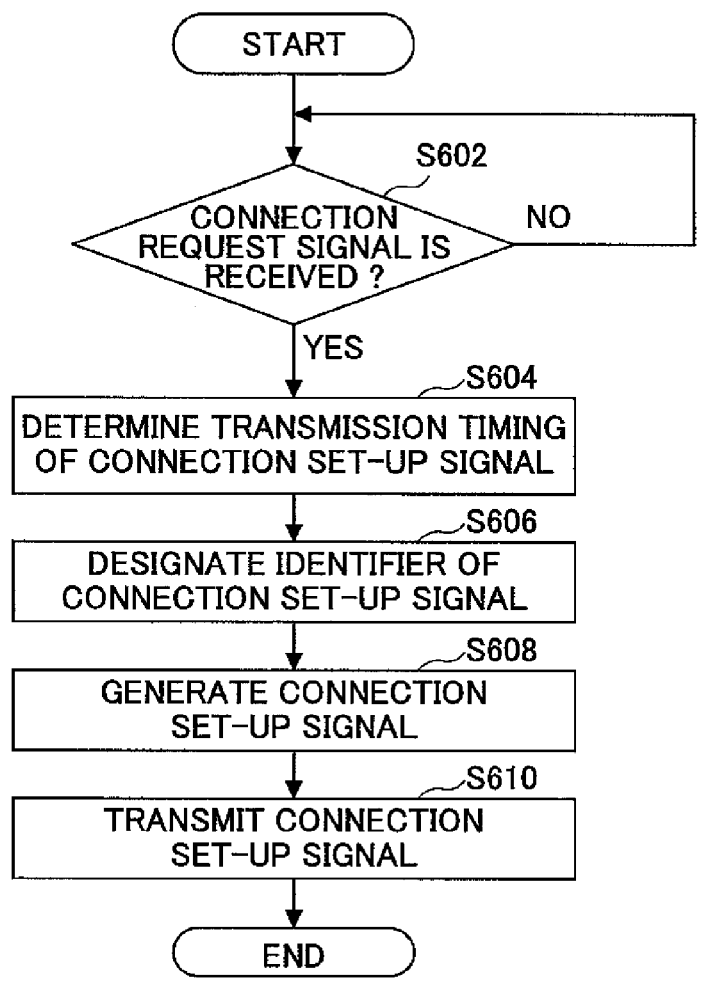
FIG. 6 is a flowchart illustrating operations of the wireless access network device 100 according to the embodiment of the present invention.

First, operations of the wireless access network device 100 of the present embodiment are described with reference to FIG. 6.

The connection request signal reception determination unit 104 determines whether the connection request signal is received (step S602).

When the RRC connection request signal is received (step S602, YES), the connection set-up signal scheduling unit 106 determines, at predetermined timings, the transmission timing of the RRC connection set-up signal based on the reception timing of the RRC connection request signal (step S604).

Figure 7:
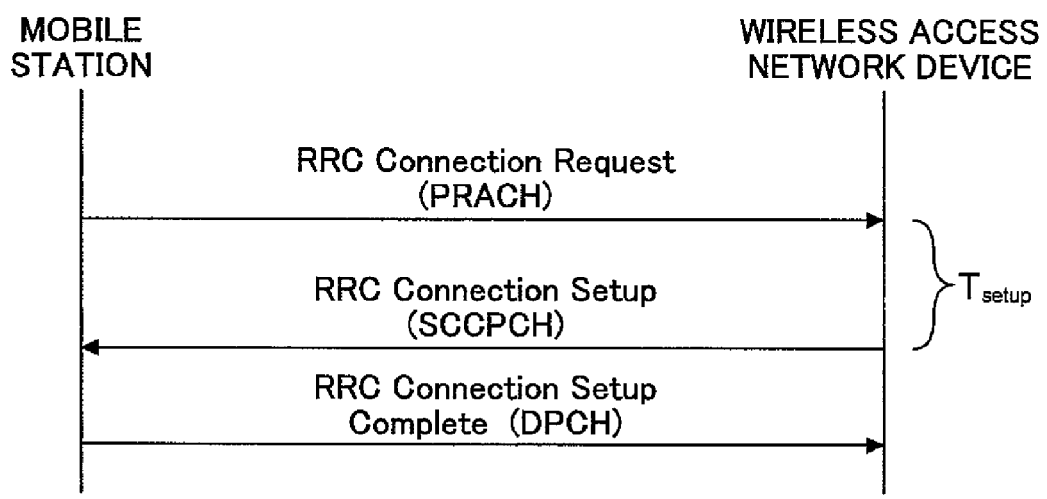
FIG. 7 is a sequence diagram illustrating operations of the mobile communication system according to the embodiment of the present invention.

For example, as shown in FIG. 7, the connection set-up signal scheduling unit 106 sets the period from the time the RRC connection request signal is received from the mobile station to the time the RRC connection set-up signal is transmitted to be the fixed value Tsetup in advance, and determines the transmission timing based on the fixed value Tsetup. The connection set-up signal scheduling unit 106 may use the maximum of possible transmission timings of the RRC connection set-up signal as the fixed value Tsetup.

On the other hand, when the RRC connection request signal is not received (step S602, NO), the routine proceeds to step S602.

Next, the identifier designation unit 108 designates an identifier of the RRC connection set-up signal (step S606). For example, the identifier designation unit 108 assigns at least one of the identifier between the mobile station 200 and the core network, the identifier indicating the RRC connection set-up signal, the temporary identifier selected by the mobile station when transmitting the RRC connection request signal, and the identifier indicating a cell.

Next, the connection set-up signal generation unit 110 generates the RRC connection set-up signal based on the identifier assigned by the identifier designation unit 108 (step S608). For example, the connection set-up signal generation unit 110 appends the identifier designated in the identifier designation unit 108 to generate the RRC connection set-up signal.

Next, the data transmission and reception unit 102 transmits the connection set-up signal generated in the connection set-up signal generation unit 110 at timings determined in the connection set-up signal scheduling unit 106. For example, the data transmission and reception unit 102 may use the channel for transmitting the RRC connection set-up signal as the shared channel, and may transmit part of the identifier through a signaling control channel. In doing so, it is not necessary to perform channel switching during connection set-up.

Figure 8:
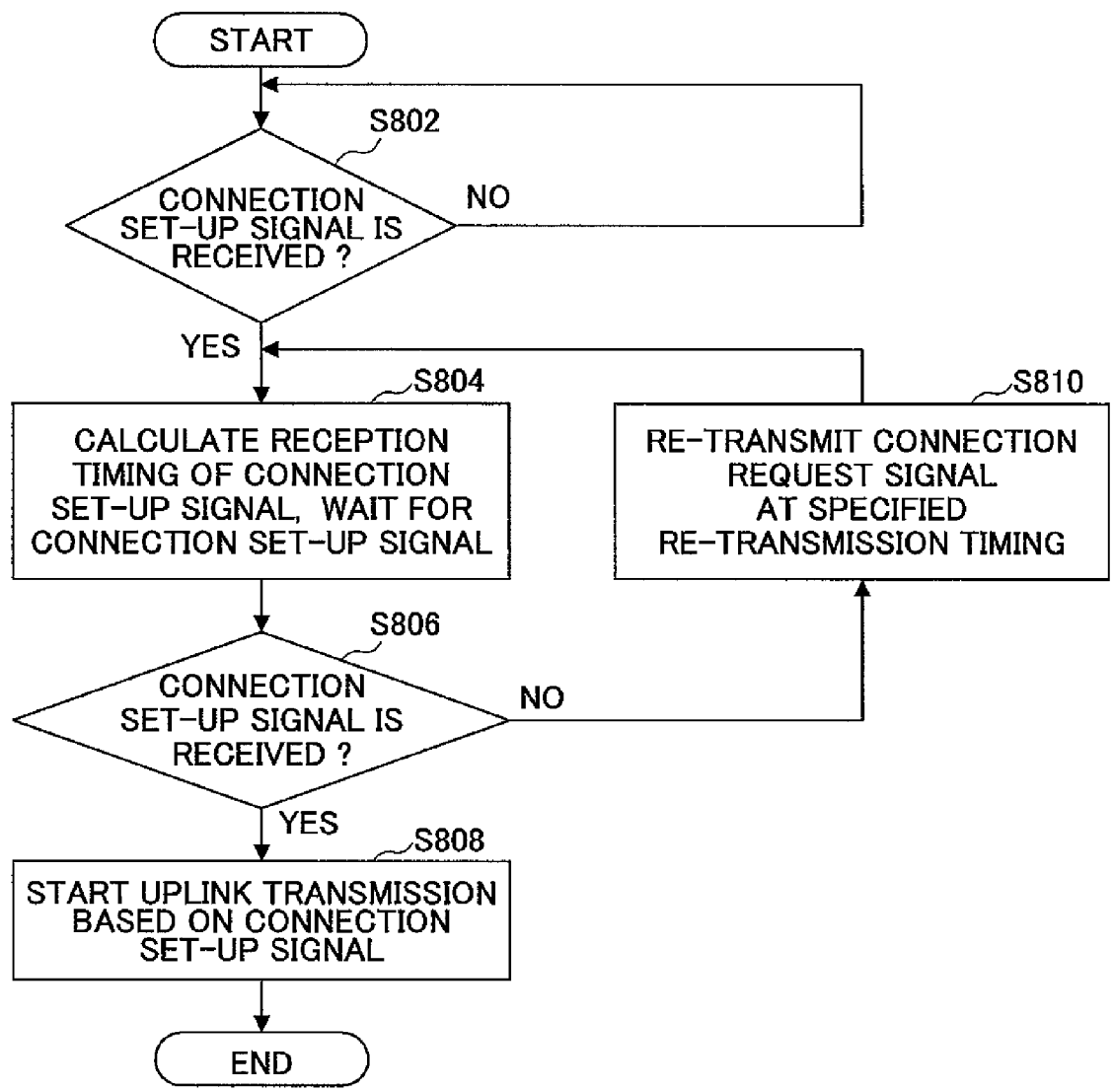
FIG. 8 is a flowchart illustrating operations of the mobile station according to the embodiment of the present invention.

Next, operations of the mobile station 200 of the present embodiment are described with reference to FIG. 8.

First, the connection request signal transmission unit 204 determines whether the RRC connection set-up signal is received (step S802).

When the RRC connection set-up signal is received, the connection set-up signal reception timing calculation unit 210 calculates the reception timing of the RRC connection set-up signal based on the transmission timing of the RRC connection request signal. The connection set-up signal reception determination unit 208 waits for the RRC connection set-up signal according to the reception timing of the RRC connection set-up signal (step S804). For example, the connection set-up signal reception timing calculation unit 210 adds the above mentioned fixed value Tsetup to the transmission timing of the RRC connection request signal, and uses the obtained result as the reception timing of the RRC connection set-up signal. The connection set-up signal reception determination unit 208 waits for the RRC connection set-up signal at the calculated reception timing of the RRC connection set-up signal.

The connection set-up signal reception determination unit 208 may continue to receive the RRC connection set-up signal after transmission of the RRC connection request signal until the time period Tsetup elapses. Here, Tsetup may be defined as a specification, or may be transmitted to the mobile station 200 through system information from the wireless access network device 100.

Next, at the calculated reception timing of the RRC connection set-up signal, the connection set-up signal reception determination unit 208 determines whether a RRC connection set-up signal sent to the connection set-up signal reception determination unit 208 itself is received (step S806). Here, the connection set-up signal reception determination unit 208 determines whether the RRC connection set-up signal sent to itself is received based on the identifier.

When it is determined that the RRC connection set-up signal is sent to the connection set-up signal reception determination unit 208 itself (step S806, YES), the mobile station 200 starts uplink transmission based on connection information specified by the connection set-up signal (step S808).

When the RRC connection set-up signal sent to the connection set-up signal reception determination unit 208 itself is not received (step S806, NO), the connection request signal re-transmission timing determination unit 206 re-transmits the RRC connection request signal at the re-transmission timings specified by the wireless access network device 100 in advance until the maximum re-transmission times (step S810).

In the above embodiment, it is described that the mobile station requests the wireless access network device for connection. It should be noted that the present invention is applicable when the wireless access network device makes the connection request to the mobile station.

As described above, in the present embodiment, transmission assignment of the RRC connection set-up signal is performed after a fixed time period elapses from the time the RRC connection request signal is received. Due to this, the mobile station performs signal reception operations at known reception timings, and the mobile station can perform determination operations at a high speed, namely, continue communications when a signal sent to the mobile station itself is received, and re-transmit signals when the signal sent to the mobile station itself is not received.

In addition, since the reception timings of the RRC connection set-up signal are known, and the mobile station performs signal reception operations of the RRC connection set-up signal only at these known reception timings, it is possible to lower the power consumption of the battery.

In addition, since it is possible to quickly determine whether it is necessary to re-transmit the RRC connection request signal according to whether the signal sent to the mobile station itself is present or not at the reception timings, it is possible to reduce the connection delay.

Further, since the RRC connection set-up signal is transmitted through the common channel, it is not necessary to perform channel switching from the shared channel to the dedicated physical channel, and it is possible to reduce the time required for setting up the dedicated physical channel and synchronization of the dedicated physical channel, and reduce the workload.

While the invention has been described with reference to preferred embodiments, the invention is not limited to these embodiments, but numerous modifications could be made thereto without departing from the basic concept and scope described in the claims.

INDUSTRY APPLICABILITY

The present invention is applicable to a mobile station and a wireless access network device in a mobile communication system, and the mobile communication system itself.

This international application is based on Japanese Priority Patent Application No. 2005-217578 filed on Jul. 27, 2005, the entire contents of which are hereby incorporated by reference.

The invention claimed is:

1. A mobile station configured to transmit a connection request signal to a wireless access network device for bi-directional communications with the wireless access network device, comprising:
a processor configured to:
calculate a reception timing of a connection set-up signal based on a transmission timing of the connection request signal, when the connection request signal is transmitted; and
perform a signal reception of the connection set-up signal only at the calculated reception timing of the connection set-up signal and to determine whether the connection set-up signal is received,
wherein the processor is configured to calculate the reception timing by adding a predetermined time value to the transmission timing of the connection request signal, and
wherein the processor is configured to perform the signal reception of the connection set-up signal, being used for setting up a connection between the mobile station and the wireless access network device, after a fixed time period has elapsed from the transmission timing of the connection request signal, the fixed time period being determined based on the predetermined time value.

2. The mobile station as claimed in claim 1, wherein the processor is further configured to determine whether the connection set-up signal is received or not based on an identifier indicating the connection set-up signal or a temporary identifier.

3. A wireless access network device configured to receive connection request signal from mobile station for bi-directional communication with the mobile station, comprising:
a processor configured to:
perform, when the connection request signal is received from the mobile station, a connection set-up signal transmission assignment based on a reception timing of the connection request signal, wherein a transmission time of the connection set-up signal is set as a fixed period from the time the connection request signal is received;
generate a connection set-up signal to be sent to the mobile station; and
transmit the connection set-up signal based on the connection set-up signal transmission assignment at the transmission time,
wherein the reception timing is calculated by adding a predetermined time value to the transmission timing of the connection request signal, and
wherein the processor is configured to transmit the connection set-up signal, being used for setting up a connection between the mobile station and the wireless access network device, after a fixed time period has elapsed from the reception timing of the connection request signal, the fixed time period being determined based on the predetermined time value.

4. The wireless access network devise as claimed in claim 3, wherein the processor is further configured to calculate a transmission timing by adding a predetermined time value to the reception timing of the connection requests signal in order to perform the connection set-up signal transmission assignment.

5. The wireless access network devise as claimed in claim 4, the processor is further configured to:
designate an identifier indicating the connection set-up signal or a temporary identifier, wherein the processor is configured to append the identifier indicating the connection set-up signal or the temporary identifier to the connection set-up signal.

6. The wireless access network devise as claimed in claim 4, wherein the processor is further configured to transmit the connection set-up signal through a shared channel.

7. The wireless access network devise as claimed in claim 5, wherein the processor is further configured to transmit the connection set-up signal through a shared channel.

8. The wireless access network devise as claimed in claim 3, the processor is further configured to:
designate an identifier indicating the connection set-up signal or a temporary identifier, wherein the processor is configured to append the identifier indicating the connection set-up signal or the temporary identifier to the connection set-up signal.

9. The wireless access network devise as claimed in claim 8, wherein the processor is further configured to transmit the connection set-up signal through a shared channel.

10. The wireless access network devise as claimed in claim 3, wherein the processor is further configured to transmit the connection set-up signal through a shared channel.

11. A mobile communication system in which a mobile station transmits a connection request signal to a wireless access network device for bidirectional communication between the mobile station and the wireless access network device, wherein the mobile station includes:
a first processor configured to:
calculate a reception timing of a connection set-up signal based on a transmission timing of the connection request signal when the connection request signal is transmitted; and
perform a signal reception operation of the connection set-up signal only at the calculated reception timing of the connection set-up signal and to determine whether the connection set-up signal is received, and the wireless access network device includes:

a second processor configured to:
  perform, when the connection request signal as received from the mobile station, a connection set-up signal transmission assignment based on a reception timing of the connection request signal, wherein a transmission time of the connection set-up signal is set as a fixed period from the tine the connection request signal is received;
  generate a connection set-up signal to be sent to the mobile station; and
  transmit the connection set-up signal based on the connection set-up signal transmission assignment at the transmission time,
  wherein the second processor is configured to calculate the reception timing by adding a predetermined time value to the transmission timing of the connection request signal, and
  wherein the second processor is configured to perform the signal reception of the connection set-up signal, being used for setting up a connection between the mobile station and the wireless access network device, after a fixed time period has elapsed from the transmission timing of the connection request signal, the fixed time period being determined based on the predetermined time value.

12. A mobile communication method for bi-directional communication between a mobile station and a wireless access network device, comprising:
  a connection request signal transmission step for transmitting a connection request signal from the mobile station;
  a connection set-up signal reception timing calculation step for calculating, by the mobile station, a reception timing of a connecting set-up signal based on a transmission timing of the connecting request signal;
  a connection request signal reception step for receiving, by the wireless access network device, the connection request signal from the mobile station;
  a connection set-up signal scheduling unit step for performing, by the wireless access network device, a connection set-up signal transmission assignment base on a reception timing of the connection request signal, wherein a transmission time of the connection set-up signal is set as a fixed period the time the connection request signal is received;
  a connection set-up signal generation step for generating, by the wireless access network device, a connection set-up signal to be sent to the mobile station;
  a connection set-up signal transmission step for transmitting, by the wireless access network device, the connection set-up signal based on the connection set-up signal transmission assignment at the transmission time;
  a connecting set-up signal reception step by the mobile station, to perform a signal reception operation of the connection set-up signal only at the calculated reception timing of the connection set-up signal; and
  a connection set-up signal determination step, by the mobile station, for determination whether the connection set-up signal is received,
  wherein in the connection set-up signal reception timing calculation step, the mobile station calculates the reception timing by adding a predetermined time value to the transmission timing of the connection request signal, and
  wherein in the connection set-up signal reception step, the signal reception operation of the connection set-up signal, being used for setting up a connection between the mobile station and the wireless access network device, is performed after a fixed time period has elapsed from the transmission timing of the connection request signal, the fixed time period being determined based on the predetermined time value.

13. The communication system as claimed in claim 12, wherein in the connection set-up signal scheduling step, the wireless access network device calculates the transmission timing by adding a predetermined time value to the reception timing of the connection request signal in order to perform the connection set-up signal transmission assignment.

* * * * *